(12) United States Patent
Roychowdhury et al.

(10) Patent No.: US 10,482,016 B2
(45) Date of Patent: Nov. 19, 2019

(54) PROVIDING PRIVATE CACHE ALLOCATION FOR POWER-COLLAPSED PROCESSOR CORES IN PROCESSOR-BASED SYSTEMS

(71) Applicant: QUALCOMM Incorporated, San Diego, CA (US)

(72) Inventors: Kaustav Roychowdhury, Bangalore (IN); Siddesh Halavarthi Math Revana, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 15/684,418

(22) Filed: Aug. 23, 2017

(65) Prior Publication Data

US 2019/0065372 A1 Feb. 28, 2019

(51) Int. Cl.
*G06F 12/0831* (2016.01)
*G06F 12/0811* (2016.01)
*G06F 12/084* (2016.01)

(52) U.S. Cl.
CPC ........ *G06F 12/0831* (2013.01); *G06F 12/084* (2013.01); *G06F 12/0811* (2013.01);
(Continued)

(58) Field of Classification Search
CPC ............ G06F 12/0831; G06F 12/0811; G06F 12/084; G06F 2212/283; G06F 2212/314; G06F 2212/621
See application file for complete search history.

(56) References Cited

U.S. PATENT DOCUMENTS 7,035,981 B1 * 4/2006 Spencer .............. G06F 12/0835
710/107
7,873,788 B1 * 1/2011 Moll ................... G06F 12/0862
711/133
(Continued)

FOREIGN PATENT DOCUMENTS

EP        0799444 A1    10/1997
WO    2013186694 A2    12/2013

OTHER PUBLICATIONS

International Search Report and Written Opinion for PCT/US2018/045372, dated Oct. 22, 2018, 19 pages.

*Primary Examiner* — Nanci N Wong
(74) *Attorney, Agent, or Firm* — Withrow & Terranova, PLLC

(57) ABSTRACT

Providing private cache allocation for power-collapsed processor cores in processor-based systems is provided. In one aspect, a processor-based system provides multiple processor cores, each residing within its own processor core power domain. Each processor core is provided with a private cache residing within its own private cache power domain, configured to be power-controlled independently of the corresponding processor core power domain. When a first processor core is placed in a power-collapsed state, a snoop controller corresponding to the private cache of the first processor core maintains power to the private cache power domain of the private cache, allowing the private cache to remain online. The snoop controller also enables allocation and snooping of the private cache by a second processor core while the first processor core remains in the power-collapsed state. In this manner, each private cache may be used for data-caching operations while its corresponding processor core is power-collapsed.

19 Claims, 7 Drawing Sheets

(52) U.S. Cl.
CPC .. *G06F 2212/283* (2013.01); *G06F 2212/314* (2013.01); *G06F 2212/621* (2013.01)

(56) References Cited

U.S. PATENT DOCUMENTS

| | | | |
|---|---|---|---|
| 7,996,644 B2 | 8/2011 | Kottapalli | |
| 8,417,889 B2 | 4/2013 | Flemming et al. | |
| 8,706,966 B1 | 4/2014 | Kraipak et al. | |
| 9,280,471 B2 | 3/2016 | Gulati et al. | |
| 9,645,933 B2 | 5/2017 | Fan | |
| 2002/0087219 A1 | 7/2002 | Dai | |
| 2010/0185833 A1* | 7/2010 | Saito | G06F 1/3203 712/203 |
| 2012/0210073 A1* | 8/2012 | Eichenberger | G06F 12/0837 711/146 |
| 2013/0173958 A1* | 7/2013 | Atherton | G06F 12/084 714/19 |
| 2013/0311725 A1 | 11/2013 | Greenhalgh | |
| 2014/0215252 A1* | 7/2014 | Fullerton | H03K 19/096 713/324 |
| 2017/0132129 A1* | 5/2017 | Ogasawara | G06F 1/263 |

\* cited by examiner

PROVIDING PRIVATE CACHE ALLOCATION FOR POWER-COLLAPSED PROCESSOR CORES IN PROCESSOR-BASED SYSTEMS

BACKGROUND

I. Field of the Disclosure

The technology of the disclosure relates generally to cache management in multicore processor-based systems, and, in particular, to reallocating caches among processor cores.

II. Background

Modern computer processor architectures frequently make use of multicore processors, which are computing elements that include two or more "cores," or processing units. Some computer processor architectures, such as those used for low-power mobile applications, provide a separate processor core power domain for each processor core of a multicore processor. In this manner, all elements of each processor core can be powered by the same power and ground supply. Such multicore processors often also provide shared caches that are accessible by all processor cores. Because access to the shared caches must be arbitrated among the processor cores, the use of shared caches by multicore processors may result in increased cache access latency.

To mitigate the effects of arbitration latency, the processor core power domain for each processor core of a multicore processor often includes a private cache (e.g., a Level 2 (L2) cache, as a non-limiting example) that is accessible only by that processor core. For example, in an eight-core processor, each of the eight processor cores is associated with its own power domain and its own private cache. The use of private caches improves arbitration latency, which improves overall processor and system performance.

However, when a processor core of a multicore processor is placed in a "power-collapsed" or shutdown state (e.g., in the course of conventional power management), the corresponding private cache residing in a same power domain becomes unavailable for use, and thus does not contribute to performance improvement. For example, benchmark applications used to measure processor performance typically employ between one and four processor cores. Consequently, in an eight-core processor, between four and seven of the available processor cores may be placed in a power-collapsed state. This renders the corresponding private caches unavailable for use, resulting in decreased processor performance and possibly inaccurate benchmark results.

SUMMARY OF THE DISCLOSURE

Aspects according to the disclosure include providing private cache allocation for power-collapsed processor cores in processor-based systems. In this regard, in one aspect, a processor-based system provides multiple processor cores, each residing within its own processor core power domain. Additionally, the processor-based system provides each of the processor cores with a private cache that resides within its own private cache power domain. Each private cache power domain is configured to be power-controlled independently of its corresponding processor core power domain. When a given processor core of the plurality of processor cores is placed in a power-collapsed state, a snoop controller corresponding to the private cache of the processor core maintains power to the private cache power domain of the private cache, allowing the private cache to remain online. The snoop controller is also configured to enable allocation and snooping of the private cache by other processor cores while the processor core corresponding to the private cache remains in a power-collapsed state. In this manner, each private cache may be used by other active processor cores for data-caching operations when the processor core corresponding to the private cache is power-collapsed. When the processor core is later placed in an active state, the snoop controller continues to allow the corresponding private cache to be snooped by other processor cores, but disables allocation of the private cache by other processor cores.

In another aspect, a processor-based system for providing private cache allocation is provided. The processor-based system includes a plurality of processor core power domains, each comprising a processor core. The processor-based system also includes a plurality of private cache power domains, each corresponding to a processor core power domain of the plurality of processor core power domains and comprising a private cache. The processor-based system further includes a shared cache power domain comprising a plurality of snoop controllers, each corresponding to a private cache power domain of the plurality of private cache power domains. Each private cache power domain of the plurality of private cache power domains is configured to be power-controlled independently of the corresponding processor core power domain. Each snoop controller of the plurality of snoop controllers is configured to determine that a first processor core of a processor core power domain associated with the snoop controller has entered a power-collapsed state. Each snoop controller of the plurality of snoop controllers is further configured to, responsive to the first processor core entering the power-collapsed state, maintain power to the private cache associated with the snoop controller. Each snoop controller of the plurality of snoop controllers also configured to, responsive to the first processor core entering the power-collapsed state, enable allocation and snooping of the private cache of the private cache power domain associated with the snoop controller by a second processor core of a second processor core power domain of the plurality of processor core power domains while the first processor core remains in the power-collapsed state.

In another aspect, a processor-based system for providing private cache allocation is provided. The processor-based system comprises a means for determining that a first processor core of a first processor core power domain of a plurality of processor core power domains has entered a power-collapsed state. The processor-based system further comprises a means for maintaining power to a private cache corresponding to the first processor core power domain, responsive to the first processor core entering the power-collapsed state. The processor-based system also comprises a means for enabling allocation and snooping of the private cache by a second processor core of a second processor core power domain of the plurality of processor core power domains while the first processor core remains in the power-collapsed state, responsive to the first processor core entering the power-collapsed state.

In another aspect, a method for providing private cache allocation is provided. The method comprises determining, by a snoop controller of a plurality of snoop controllers, that a first processor core of a processor core power domain of a plurality of processor core power domains corresponding to the plurality of snoop controllers has entered a power-collapsed state. The method further comprises, responsive to the first processor core entering the power-collapsed state, maintaining power to a private cache of a private cache power domain of a plurality of private cache power domains corresponding to the plurality of snoop controllers. The method also comprises, responsive to the first processor core entering the power-collapsed state, enabling allocation and snooping of the private cache by a second processor core of a second processor core power domain of the plurality of processor core power domains while the first processor core remains in the power-collapsed state.

In another aspect, a non-transitory computer-readable medium having stored thereon computer-executable instructions is provided. The computer-executable instructions, when executed by a processor, cause the processor to determine that a first processor core of a processor core power domain of a plurality of processor core power domains has entered a power-collapsed state. The computer-executable instructions further cause the processor to, responsive to the first processor core entering the power-collapsed state, maintain power to a private cache of a private cache power domain of a plurality of private cache power domains corresponding to the plurality of processor core power domains. The computer-executable instructions also cause the processor to, responsive to the first processor core entering the power-collapsed state, enable allocation and snooping of the private cache by a second processor core of a second processor core power domain of the plurality of processor core power domains while the first processor core remains in the power-collapsed state.

DETAILED DESCRIPTION

Figure 1:
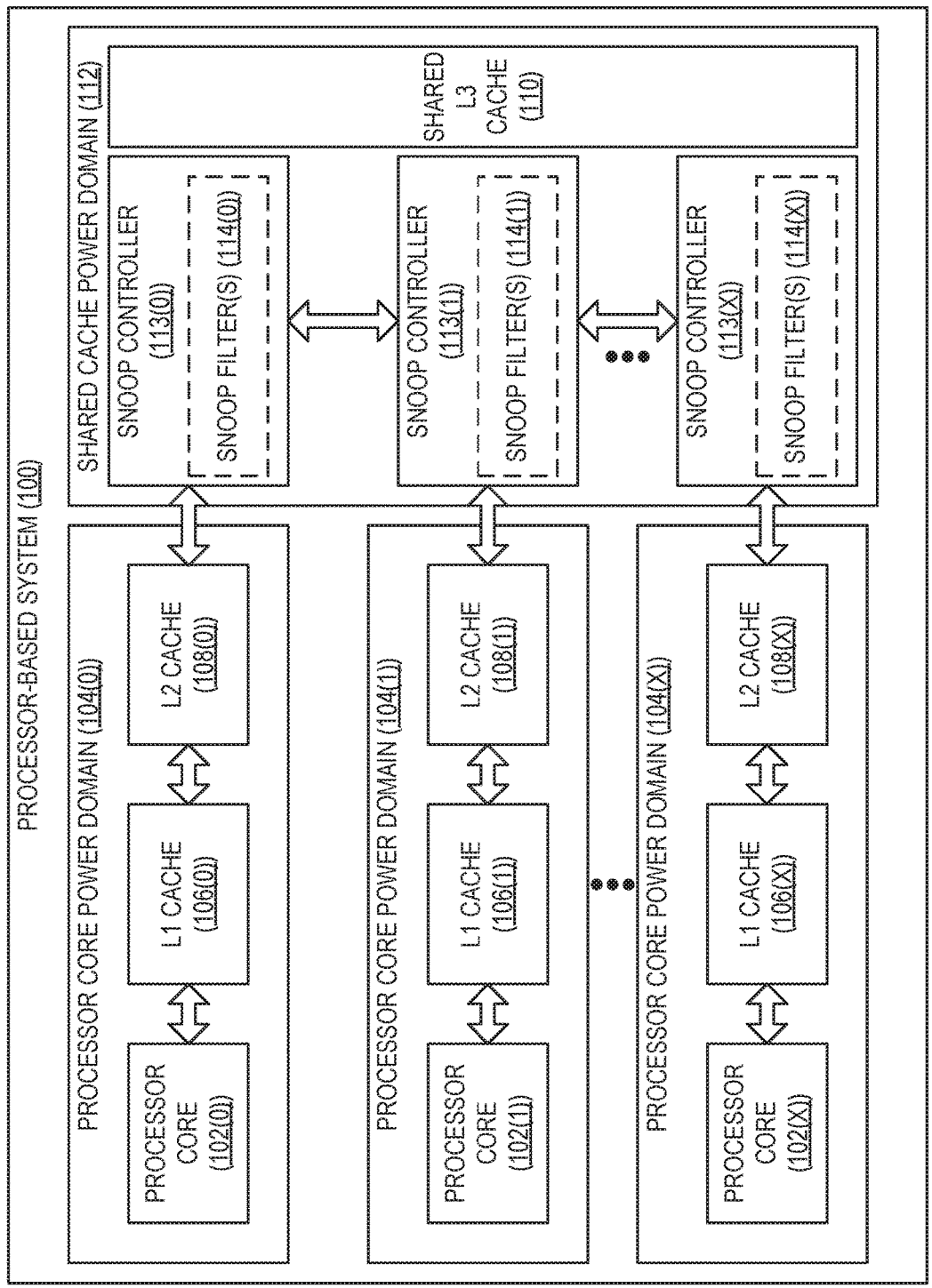
FIG. 1 is a block diagram of a conventional processor-based system including multiple processor cores and corresponding private caches, with each processor core and its private caches co-located within a single processor core power domain.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The words "first," "second," and the like are used herein to distinguish between multiple instances of an element, and are not to be read as implying a position or order of an instance relative to other instances of the element.

Aspects according to the disclosure include providing private cache allocation for power-collapsed processor cores in processor-based systems. In this regard, in one aspect, a processor-based system provides multiple processor cores that are each associated with a private cache that resides within its own private cache power domain, and that is configured to be power-controlled independently of the corresponding processor core. Before describing an exemplary processor-based system providing private cache allocation when a processor core is power-collapsed, the constituent elements and operations of a conventional multicore processor-based system are first described. In this regard, FIG. 1 illustrates an exemplary processor-based system 100 that includes multiple processor cores 102(0)-102(X). Each of the processor cores 102(0)-102(X) resides within a corresponding processor core power domain 104(0)-104(X), and thus is powered by a same power source and ground. The processor cores 102(0)-102(X) are communicatively coupled to private caches, which in the example of FIG. 1 are Level 1 (L1) caches 106(0)-106(X) and Level 2 (L2) caches 108(0)-108(X). It is to be understood that the L1 caches 106(0)-106(X) and the L2 caches 108(0)-108(X) each may comprise one or more of a data array, a tag array, and/or a cache controller, which are not shown in FIG. 1 for the sake of clarity.

The processor cores 102(0)-102(X) also share a shared Level 3 (L3) cache 110, which resides in a shared cache power domain 112. As with the L1 caches 106(0)-106(X) and the L2 caches 108(0)-108(X), the shared L3 cache 110 may include a data array, a tag array, and/or a cache controller, which are omitted from FIG. 1. To maintain data coherency for the shared L3 cache 110, snoop controllers 113(0)-113(X) are provided within the shared cache power domain 112. Each of the snoop controllers 113(0)-113(X) handles snoop operations among the corresponding processor cores 102(0)-102(X) and the L2 caches 108(0)-108(X) of the other processor cores 102(0)-102(X). In some aspects, each of the snoop controllers 113(0)-113(X) may provide one or more snoop filters 114(0)-114(X), which maintain entries representing memory or cache lines that may be owned by one or more of the processor cores 102(0)-102(X).

In the example of FIG. 1, the use of the shared L3 cache 110 may offer benefits such as faster data transfer between the processor cores 102(0)-102(X) compared to a system memory (not shown). As noted above, though, access to the shared L3 cache 110 must be arbitrated among the processor cores 102(0)-102(X), which may result in increased cache access latency. The effects of arbitration latency is reduced through the use of private caches such as the L2 caches 108(0)-108(X), each of which is accessible only by the corresponding processor core 102(0)-102(X). However, because each L2 cache 108(0)-108(X) resides within the processor core power domain 104(0)-104(X) of the corresponding processor core 102(0)-102(X), the L2 caches 108(0)-108(X) become unavailable for use when the corresponding processor core 102(0)-102(X) is placed in a power-collapsed state. As a result, this unavailability of one or more of the L2 caches 108(0)-108(X) may negatively impact overall performance of the processor-based system 100.

Figure 2:
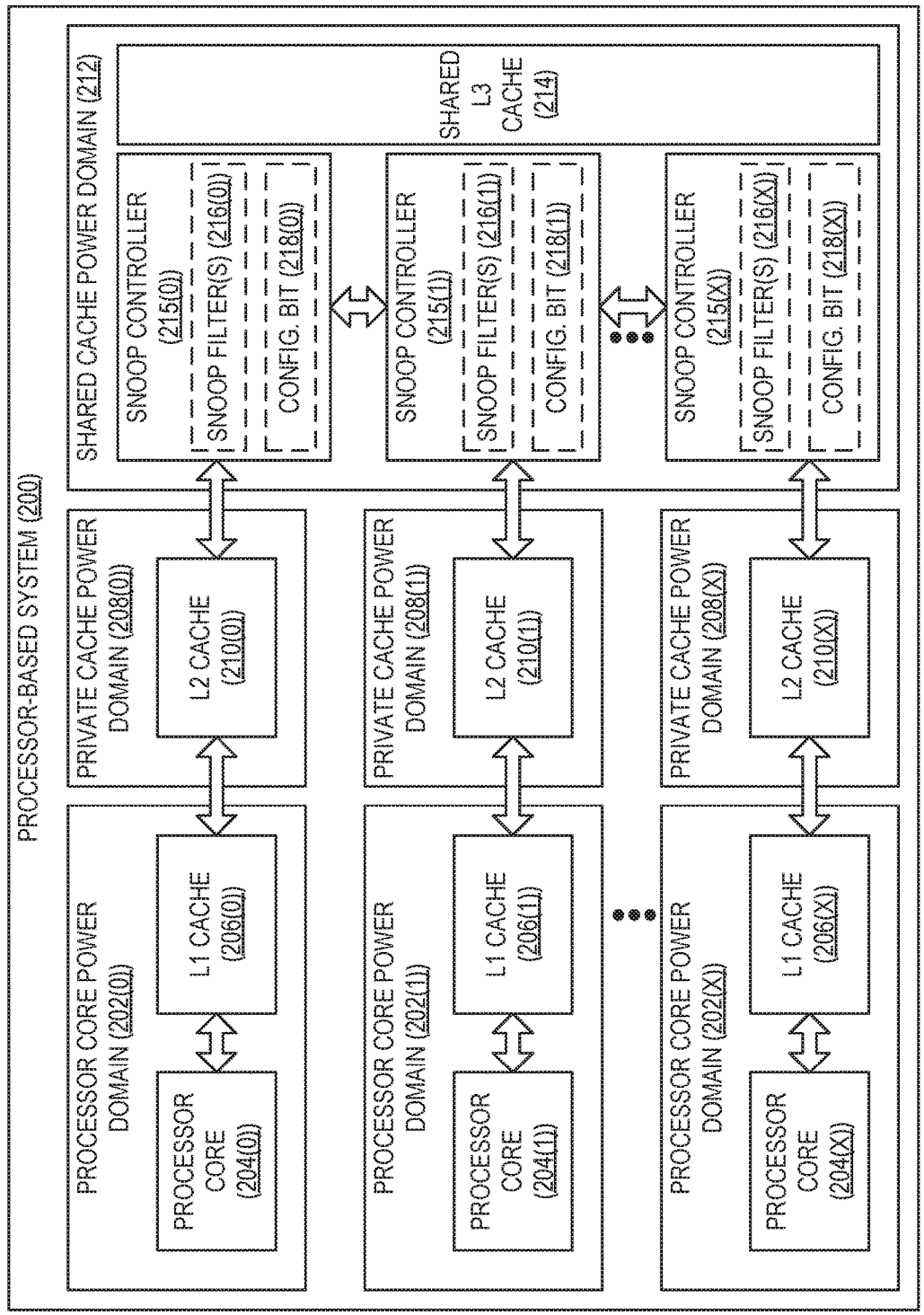
FIG. 2 is a block diagram of a processor-based system for providing private cache allocation for power-collapsed processor cores.

In this regard, FIG. 2 illustrates an exemplary processor-based system 200 for providing private cache allocation for power-collapsed processor cores. As seen in FIG. 2, the processor-based system 200 include a plurality of processor core power domains 202(0)-202(X), each containing a processor core 204(0)-204(X) and an L1 cache 206(0)-206(X). The processor-based system 200 also provides a plurality of private cache power domains 208(0)-208(X) corresponding to the processor core power domains 202(0)-202(X). Each of the private cache power domains 208(0)-208(X) is configured to be power-controlled independently of the corresponding processor core power domains 202(0)-202(X), such that a given one of the private cache power domains 208(0)-208(0) can remain in an active state when the processor core 204(0)-204(X) of the corresponding processor core power domain 202(0)-202(X) enters a power-collapsed state. In this manner, the L2 caches 210(0)-210(X) associated with a power-collapsed processor core 204(0)-204(X) may remain accessible to other, active processor cores 204(0)-204(X). It is to be understood that the L2 caches 210(0)-210(X) may be referred to herein more generally as "private caches 210(0)-210(X)," and that, in some aspects, the "private caches 210(0)-210(X)" may comprise other levels of caches, such as L1 or L3 caches. It is to be further understood that, according to some aspects, the private cache power domains 208(0)-208(X) may be provided for other levels of private caches not shown in FIG. 2, such as L1 or L3 caches.

The processor-based system 200 further provides a shared cache power domain 212, within which resides a shared L3 cache 214 and a plurality of snoop controllers 215(0)-215(X) corresponding to the L2 caches 210(1)-210(X). Some aspects of the snoop controllers 215(0)-215(X) may provide one or more snoop filters 216(0)-216(X) for use in maintaining data coherency among the processor cores 204(0)-204(X). As discussed in greater detail below with respect to FIGS. 3 and 4, when a processor core such as the processor core 204(0) is placed in a power-collapsed state, the snoop controller 215(0) corresponding to the L2 cache 210(0) of the processor core 204(0) causes power to be maintained to the private cache power domain 208(0) of the L2 cache 210(0), allowing the L2 cache 210(0) to remain online. The snoop controller 215(0) is also configured to enable allocation and snooping of the L2 cache 210(0) by the processor cores 204(0)-204(X) while the processor core 204(0) remains in the power-collapsed state. When the processor core 204(0) later returns to an active state, the snoop controller 215(0) continues to allow the corresponding L2 cache 210(0) to be snooped by the processor cores 204(0)-204(X), but disables allocation of the L2 cache 210(0) by the processor cores 204(0)-204(X).

It is to be understood that the processor-based system 200 of FIG. 2 may encompass any one of known digital logic elements, semiconductor circuits, and processing cores, and/or memory structures, among other elements, or combinations thereof. Aspects described herein are not restricted to any particular arrangement of elements, and the disclosed techniques may be easily extended to various structures and layouts on semiconductor dies or packages. It is to be further understood that some aspects of the processor-based system 200 may include elements in addition to those illustrated in FIG. 2.

Some aspects may provide that the private cache allocation feature of the processor-based system 200 in FIG. 2 may be selectively enabled and disabled on a per-processor-core basis. In such aspects, each of the snoop controllers 215(0)-215(X) may provide a configuration bit ("CONFIG. BIT") 218(0)-218(X) to indicate whether allocation of the L2 caches 210(0)-210(X) is enabled. For example, if a given configuration bit, such as the configuration bit 218(0) of the snoop controller 215(0), is set, the snoop controller 215(0) may enable allocation and snooping of the L2 cache 210(0) while the processor core 204(0) is in a power-collapsed state. If the configuration bit 218(0) is cleared, the snoop controller 215(0) may operate in a conventional fashion with respect to the L2 cache 210(0) when the processor core 204(0) is in the power-collapsed state.

Figure 3:
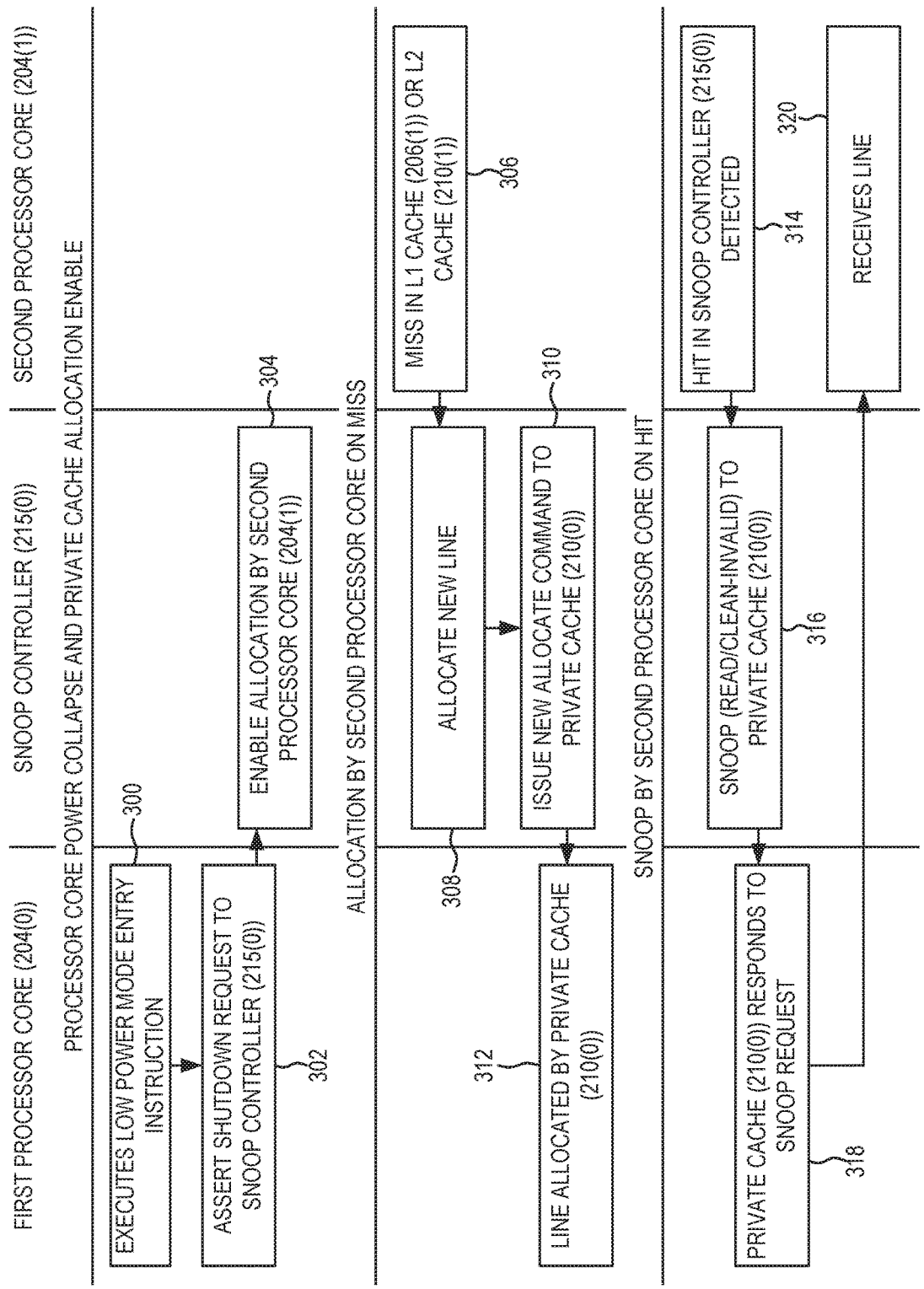
FIG. 3 is a diagram illustrating exemplary communications flows among processor cores and snoop controllers of FIG. 2 when performing power collapse, cache allocation, and cache snooping operations.

FIG. 3 is a diagram illustrating exemplary communications flows among the processor cores 204(0)-204(X) and the snoop controllers 215(0)-215(X) of FIG. 2 when performing power collapse, cache allocation, and cache snooping operations. In FIG. 3, operations performed by a first processor core (in this example, the processor core 204(0)) are shown in the leftmost vertical column. Similarly, operations performed by a snoop controller associated with the first processor core 204(0) (here, the snoop controller 215(0)) are shown in the center column, and operations performed by a second processor core (the processor core 204(1), in the example of FIG. 3) are shown in the rightmost column of FIG. 3. The operations involved in enabling private cache allocation in response to the first processor core 204(0) entering a power-collapsed state are discussed first, followed by operations involved in allocating a cache line in the private cache 210(0) by the second processor core 204(1) in response to a cache miss and operations performed in snooping the private cache 210(0) by the second processor core 204(1) in response to a hit in the snoop controller 215(0). It is to be understood that FIG. 3 refers to the processor core 204(0), the snoop controller 215(0), and the processor core 204(1) of FIG. 2 as non-limiting examples, and that the "first processor core," the "snoop controller," and the "second processor core" of FIG. 3 may refer to other elements of FIG. 2 in other aspects.

FIG. 3 first illustrates operations that occur in some aspects when the first processor core 204(0) enters a power-collapsed state. To enter a power-collapsed state, the first processor core 204(0) executes a low power mode entry instruction, which places the first processor core 204(0) in a low-power state by, for example, disabling processor clocks, collapsing the processor core power domain 104(0), and asserting isolation control and reset (block 300). The first processor core 204(0) then asserts a shutdown request to the snoop controller 215(0) (block 302). Upon receiving the shutdown request, the snoop controller 215(0) enables allocation of the private cache 210(0) of the first processor core 204(0) by the second processor core 204(1) while the first processor core 204(0) remains in a power-collapsed state (block 304).

Next, the operations involved in allocating a private cache line in response to a cache miss by the second processor core 204(1) are shown. While the first processor core 204(0) is in the power-collapsed state, the second processor core 204(1) performs a cache access operation on the L1 cache 206(1) and/or the L2 cache 210(1) that results in a cache miss (block 306). In response, the snoop controller 215(0) allocates a new line (block 308), and issues a new allocate command to the private cache 210(0) of the first processor core 204(0) (block 310). The private cache 210(0), upon receiving the allocate command, allocates a cache line within the private cache 210(0) for use by the second processor core 204(1) (block 312).

Finally, FIG. 3 shows operations that are performed in snooping the private cache 210(0) in response to a hit in the snoop controller 215(0) by the second processor core 204(1). As seen in FIG. 3, the second processor core 204(1) determines that a hit in the snoop controller 215(0) has occurred (block 314). In response, the snoop controller 215(0) issues a snoop request (e.g., a read request or a clean-invalid request) to the private cache 210(0) (block 316). The private cache 210(0) of the first processor core 204(0) next responds to the snoop request from the snoop controller 215(0) (block 318). The second processor core 204(1) then receives a cache line from the private cache 210(0) (block 320).

Figure 4:
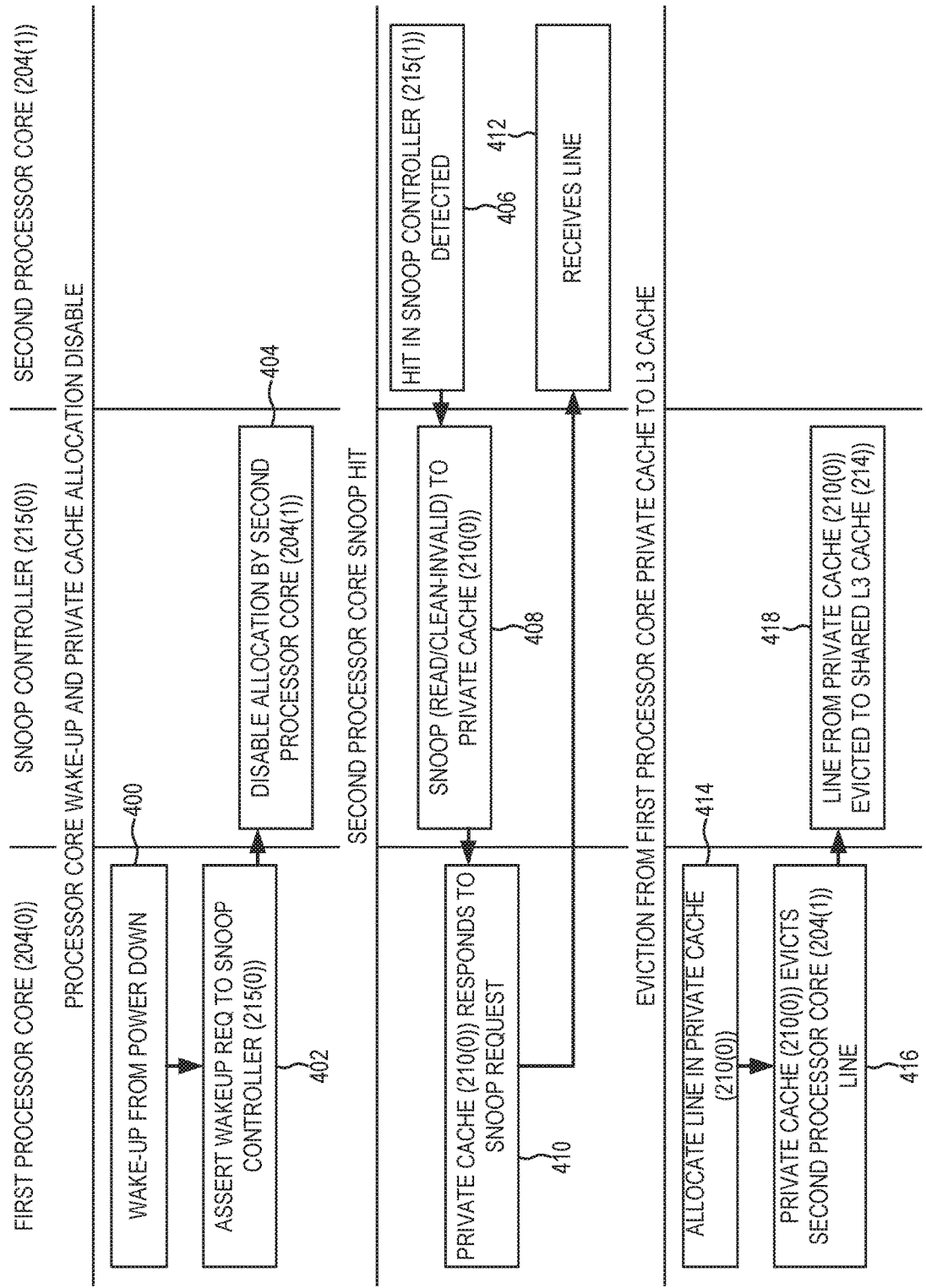
FIG. 4 is a diagram illustrating exemplary communications flows among processor cores and snoop controllers of FIG. 2 when performing wake-up, cache allocation, and cache eviction operations.

To illustrate exemplary communications flows among the processor cores 204(0)-204(X) and the snoop controllers 215(0)-215(X) of FIG. 2 when performing wake-up, cache allocation, and cache eviction operations, FIG. 4 is provided. As with FIG. 3, in FIG. 4 operations performed by a first processor core (e.g., the processor core 204(0)) are shown in the leftmost vertical column, while operations performed by a snoop controller associated with the first processor core 204(0) (in this example, the snoop controller 215(0)) and operations performed by a second processor core (the processor core 204(1)) are shown in the center column and the rightmost column, respectively. FIG. 4 first illustrates operations involved in disabling private cache allocation in response to the first processor core 204(0) returning to an active state, followed by operations performed in snooping the private cache 210(0) by the second processor core 204(1) in response to a hit in the snoop controller 215(0) and operations for evicting data from the private cache 210(0) to the shared L3 cache 214. FIG. 4 refers to the first processor core 204(0), the snoop controller 215(0), and the second processor core 204(1) of FIG. 2 as non-limiting examples only, and thus the "first processor core," the "snoop controller," and the "second processor core" of FIG. 4 may refer to other elements of FIG. 2 in other aspects.

Operations that are performed to disable private cache allocation after processor core wake-up are illustrated first in FIG. 4. As seen in FIG. 4, the first processor core 204(0) wakes up from its power down state (block 400). Upon waking, the first processor core 204(0) asserts a wake-up request to the snoop controller 215(0) (block 402). In response, the snoop controller 215(0) disables allocation of cache lines in the private cache 210(0) of the first processor core 204(0) by the second processor core 204(1) (block 404). With the first processor core 204(0) now in an active state, the snoop controller 215(0) continues to allow snooping of the private cache 210(0) by the second processor core 204(1), but does not allow the second processor core 204(1) to allocate any cache lines within the private cache 210(0).

Next, FIG. 4 shows operations that are performed in snooping the private cache 210(0) in response to a hit in the snoop controller 215(0) by the second processor core 204(1) while the first processor core 204(0) is in an active state. As seen in FIG. 4, the second processor core 204(1) determines that a hit in the snoop controller 215(1) has occurred (block 406). In response, the snoop controller 215(0) issues a snoop request (e.g., a read request or a clean-invalid request) to the private cache 210(0) (block 408). The private cache 210(0) of the first processor core 204(0) next responds to the snoop request from the snoop controller 215(0) (block 410). The second processor core 204(1) then receives a cache line from the private cache 210(0) (block 412).

Lastly, FIG. 4 illustrates operations for evicting cache lines from the private cache 210(0) of the first processor core 204(0) to the shared L3 cache 214. The private cache 210(0) first allocates a cache line (block 414). In doing so, the private cache 210(0) evicts a cache line originally allocated to the second processor core 204(1) (block 416). After the cache line is evicted from the private cache 210(0), the snoop controller 215(0) writes the evicted cache line to the shared L3 cache 214 (block 418).

Figure 5A:
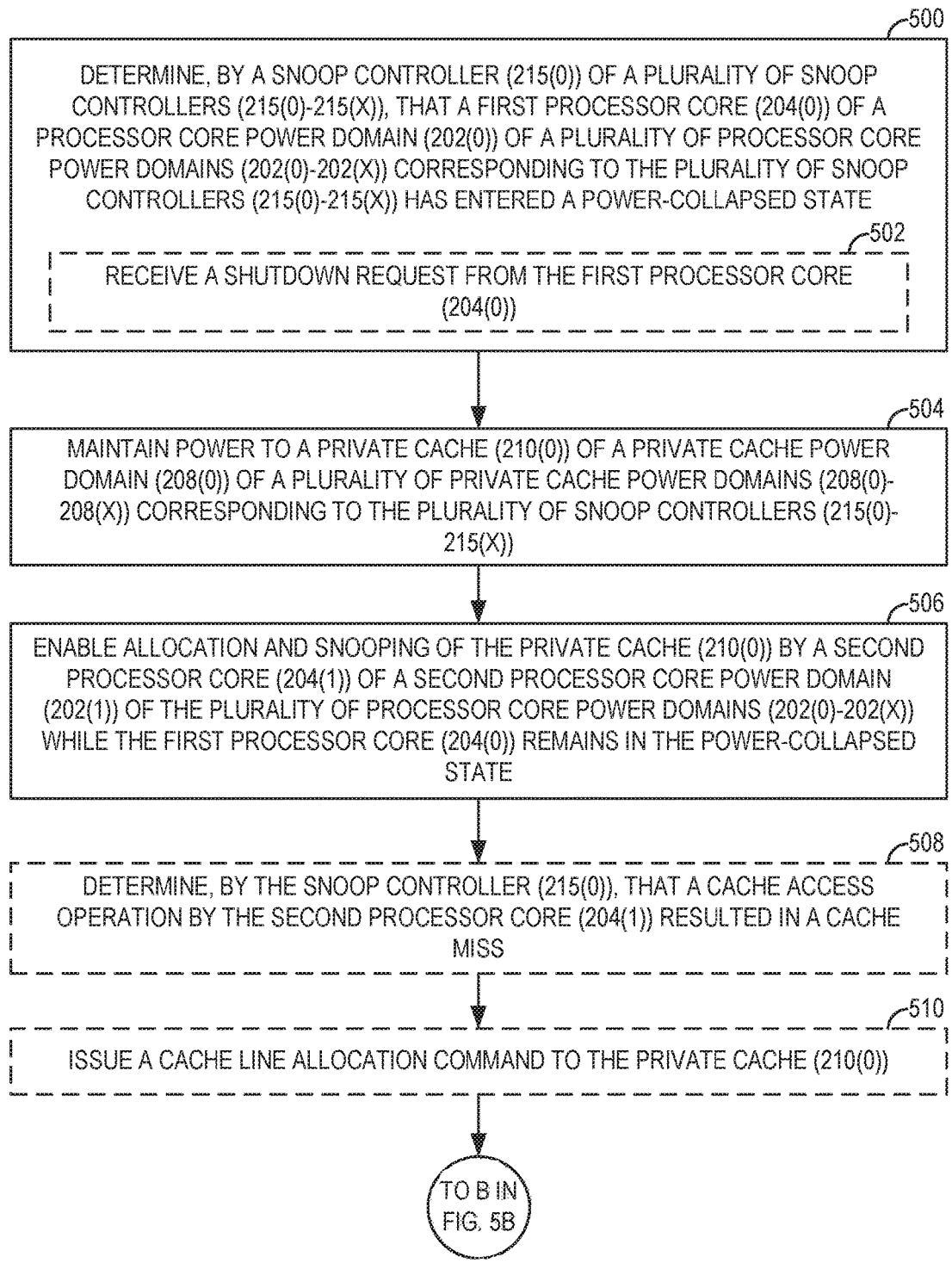
FIGS. 5A and 5B are flowcharts illustrating an exemplary process for providing cache allocation for power-collapsed processor cores by snoop controllers and private caches of FIG. 2.
Figure 5B:
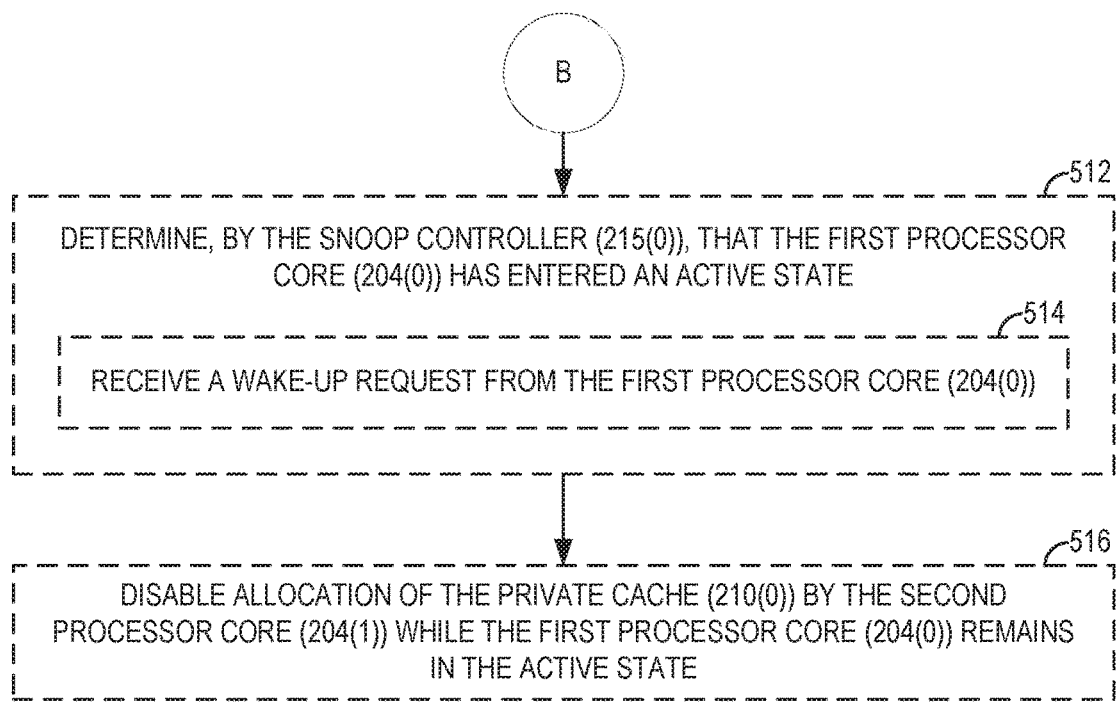

To illustrate an exemplary process for providing cache allocation for power-collapsed processor cores 204(0)-204(X) by the snoop controller 215(0) and the private L2 cache 210(0) of FIG. 2, FIGS. 5A and 5B are provided. For the sake of clarity, elements of FIG. 2 are referenced in describing FIGS. 5A and 5B. Operations in FIG. 5A begin with the snoop controller 215(0) determining that the first processor core 204(0) of the processor core power domain 202(0) of the plurality of processor core power domains 202(0)-202(X) corresponding to the plurality of snoop controllers 215(0)-215(X) has entered a power-collapsed state (block 500). In this regard, the snoop controller 215(0) may be referred to herein as "a means for determining that a first processor core of a first processor core power domain of a plurality of processor core power domains has entered a power-collapsed state." In some aspects, the operations of block 500 for determining that the first processor core 204(0) has entered the power-collapsed state include receiving a shutdown request from the first processor core 204(0) (block 502).

In response to determining that the first processor core 204(0) has entered the power-collapsed state, the snoop controller 215(0) maintains power to the private cache 210(0) of the private cache power domain 208(0) of the plurality of private cache power domains 208(0)-208(X) corresponding to the plurality of snoop controllers 215(0)-215(X) (block 504). Accordingly, the snoop controller 215(0) may be referred to herein as "a means for maintaining power to a private cache corresponding to the first processor core power domain, responsive to the first processor core entering the power-collapsed state." The snoop controller 215(0) then enables allocation of the private cache 210(0) by the second processor core 204(1) of the second processor core power domain 202(1) of the plurality of processor core power domains 202(0)-202(X) while the first processor core 204(0) remains in the power-collapsed state (block 506). The snoop controller 215(0) thus may be referred to herein as "a means for enabling allocation and snooping of the private cache by a second processor core of a second processor core power domain of the plurality of processor core power domains while the first processor core remains in the power-collapsed state, responsive to the first processor core entering the power-collapsed state." According to some aspects, the operations for enabling allocation of the private cache 210(0) by the second processor core 204(1) by the snoop controller 215(0) may be further responsive to the snoop controller 215(0) determining that the configuration bit 218(0) of the snoop controller 215(0) is set.

In some aspects, the snoop controller 215(0) may determine that a cache access operation by the second processor core 204(1) resulted in a cache miss (block 508). In response, the snoop controller 215(0) issues a cache line allocation command to the private cache 210(0) (block 510). Processing then resumes at block 512 of FIG. 5B.

Referring now to FIG. 5B, some aspects may provide that the snoop controller 215(0) next determines that the first processor core 204(0) has entered an active state (block 512). Operations of block 512 for determining that the first processor core 204(0) has entered the active state may include receiving a wake-up request from the first processor core 204(0) (block 514). In response to determining that the first processor core 204(0) has entered an active state, the snoop controller 215(0) disables allocation of the private cache 210(0) by the second processor core 204(1) while the first processor core 204(0) remains in the active state (block 516).

Providing private cache allocation for power-collapsed processor cores of processor-based systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
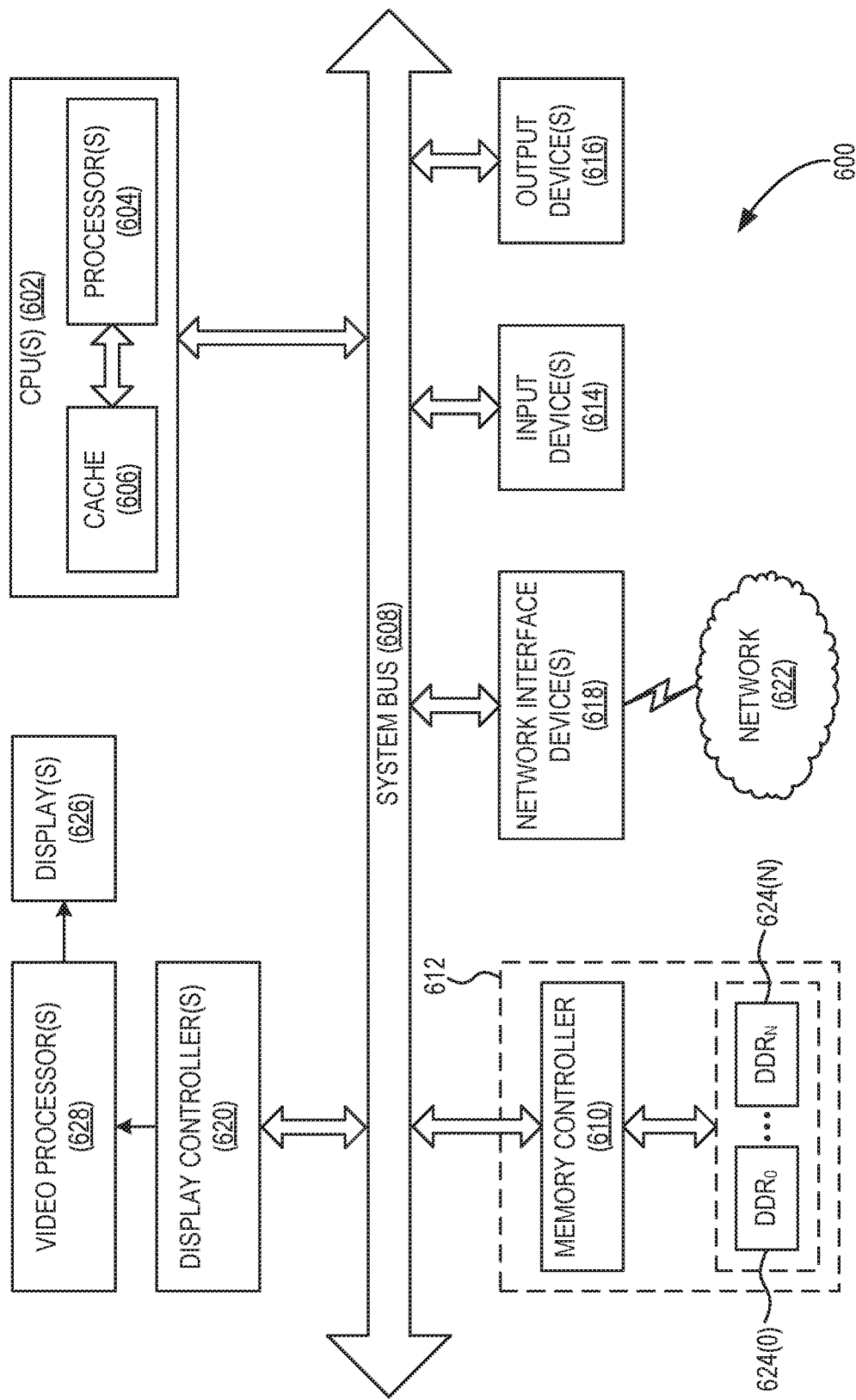
FIG. 6 is a block diagram of an exemplary processor-based system that can include the private cache power domains and snoop controllers of FIG. 2.

In this regard, FIG. 6 illustrates an example of a processor-based system 600 that corresponds to the processor-based system 200 of FIG. 2. The processor-based system 600 includes one or more CPUs 602, each including one or more processors 604, which in some aspects may comprise the processor cores 204(0)-204(X) of FIG. 2. The CPU(s) 602 may have cache memory 606 (which may comprise the L1 caches 206(0)-206(X), the L2 caches 210(0)-210(X), and the shared L3 cache 214 of FIG. 2) that is coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0)-624(N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing private cache allocation, comprising:
    determining, by a snoop controller of a plurality of snoop controllers, that a first processor core of a first processor core power domain of a plurality of processor core power domains corresponding to the plurality of snoop controllers has entered a power-collapsed state; and
    responsive to the first processor core entering the power-collapsed state:
        maintaining power to a private cache of a private cache power domain of a plurality of private cache power domains corresponding to the first processor core power domain of the plurality of processor core power domains, wherein each private cache power domain of the plurality of private cache power domains is configured to be power-controlled independently of the corresponding processor core power domain; and
        enabling allocation and snooping of the private cache by a second processor core of a second processor core power domain of the plurality of processor core power domains while the first processor core remains in the power-collapsed state;
    wherein:
        each snoop controller of the plurality of snoop controllers comprises a configuration bit indicating whether to enable allocation and snooping of the private cache of the private cache power domain corresponding to the snoop controller; and
        enabling allocation and snooping of the private cache by the second processor core while the first processor core remains in the power-collapsed state is further responsive to determining that the configuration bit of the snoop controller is set.

2. The method of claim 1, wherein determining that the first processor core has entered the power-collapsed state comprises receiving a shutdown request from the first processor core.

3. The method of claim 1, further comprising, subsequent to the first processor core entering the power-collapsed state:
    determining, by the snoop controller, that a cache access operation by the second processor core resulted in a cache miss;
    responsive to determining that the cache access operation by the second processor core resulted in the cache miss, issuing a cache line allocation command to the private cache.

4. The method of claim 1, further comprising:
    determining, by the snoop controller, that the first processor core has entered an active state; and
    responsive to the first processor core entering the active state, disabling allocation of the private cache by the second processor core while the first processor core remains in the active state.

5. The method of claim 4, wherein determining that the first processor core has entered the active state comprises receiving a wake-up request from the first processor core.

6. A non-transitory computer-readable medium having stored thereon computer-executable instructions which, when executed by a processor, cause the processor to:
    determine that a first processor core of a first processor core power domain of a plurality of processor core power domains has entered a power-collapsed state; and
    responsive to the first processor core entering the power-collapsed state:
        maintain power to a private cache of a private cache power domain of a plurality of private cache power domains corresponding to the first processor core power domain of the plurality of processor core power domains, wherein each private cache power domain of the plurality of private cache power domains is configured to be power-controlled independently of the corresponding processor core power domain; and
        enable allocation and snooping of the private cache by a second processor core of a second processor core power domain of the plurality of processor core power domains while the first processor core remains in the power-collapsed state, further responsive to determining that a configuration bit indicating whether to enable allocation and snooping of the private cache is set.

7. The non-transitory computer-readable medium of claim 6 having stored thereon computer-executable instructions which, when executed by a processor, further cause the processor to determine that the first processor core has entered the power-collapsed state by receiving a shutdown request from the first processor core.

8. The non-transitory computer-readable medium of claim 6 having stored thereon computer-executable instructions which, when executed by a processor, further cause the processor to:
    determine that a cache access operation by the second processor core resulted in a cache miss;
    responsive to determining that the cache access operation by the second processor core resulted in the cache miss, issue a cache line allocation command to the private cache.

9. The non-transitory computer-readable medium of claim 6 having stored thereon computer-executable instructions which, when executed by a processor, further cause the processor to:
    determine that the first processor core has entered an active state; and
    responsive to the first processor core entering the active state, disable allocation of the private cache by the second processor core while the first processor core remains in the active state.

10. The non-transitory computer-readable medium of claim 9 having stored thereon computer-executable instructions which, when executed by a processor, further cause the processor to determine that the first processor core has entered the active state by receiving a wake-up request from the first processor core.

11. A processor-based system for providing private cache allocation, comprising:

a plurality of processor core power domains, each comprising a processor core;
a plurality of private cache power domains, each corresponding to a processor core power domain of the plurality of processor core power domains and comprising a private cache; and
a shared cache power domain comprising a plurality of snoop controllers, each corresponding to a private cache power domain of the plurality of private cache power domains;
wherein:
each private cache power domain of the plurality of private cache power domains is configured to be power-controlled independently of the corresponding processor core power domain; and
each snoop controller of the plurality of snoop controllers is configured to:
determine that a first processor core of a processor core power domain associated with the snoop controller has entered a power-collapsed state; and
responsive to the first processor core entering the power-collapsed state:
maintain power to the private cache associated with the snoop controller; and
enable allocation and snooping of the private cache of the private cache power domain associated with the snoop controller by a second processor core of a second processor core power domain of the plurality of processor core power domains while the first processor core remains in the power-collapsed state.

12. The processor-based system of claim 11, wherein each snoop controller of the plurality of snoop controllers is configured to determine that the first processor core has entered the power-collapsed state by being configured to receive a shutdown request from the first processor core.

13. The processor-based system of claim 11, wherein:
each snoop controller of the plurality of snoop controllers comprises a configuration bit indicating whether to enable allocation and snooping of the private cache of the private cache power domain associated with the snoop controller; and
each snoop controller of the plurality of snoop controllers is configured to enable allocation and snooping of the private cache by the second processor core while the first processor core remains in the power-collapsed state further responsive to determining that the configuration bit of the snoop controller is set.

14. The processor-based system of claim 11, wherein:
each snoop controller of the plurality of snoop controllers is further configured to, subsequent to the first processor core entering the power-collapsed state:
determine that a cache access operation by the second processor core resulted in a cache miss; and
responsive to determining that the cache access operation by the second processor core resulted in the cache miss, issue a cache line allocation command to the private cache of the private cache power domain associated with the snoop controller; and
the private cache of the private cache power domain associated with the snoop controller is configured to:
receive the cache line allocation command from the snoop controller; and
responsive to receiving the cache line allocation command from the snoop controller, allocate a cache line within the private cache of the private cache power domain associated with the snoop controller for the second processor core.

15. The processor-based system of claim 11, wherein each snoop controller of the plurality of snoop controllers is further configured to:
determine that the first processor core has entered an active state; and
responsive to the first processor core of the processor core power domain associated with the snoop controller entering the active state, disable allocation of the private cache of the private cache power domain associated with the snoop controller by the second processor core while the first processor core remains in the active state.

16. The processor-based system of claim 15, wherein each snoop controller of the plurality of snoop controllers is configured to determine that the first processor core has entered the active state by being configured to receive a wake-up request from the first processor core.

17. The processor-based system of claim 11 integrated into an integrated circuit (IC).

18. The processor-based system of claim 11 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

19. A processor-based system for providing private cache allocation, comprising:
a means for determining that a first processor core of a first processor core power domain of a plurality of processor core power domains corresponding to a plurality of private cache power domains has entered a power-collapsed state, wherein each private cache power domain of the plurality of private cache power domains is configured to be power-controlled independently of the corresponding processor core power domain;
a means for maintaining power to a private cache of a private cache power domain of the plurality of private cache power domains corresponding to the first processor core power domain, responsive to the first processor core entering the power-collapsed state; and
a means for enabling allocation and snooping of the private cache by a second processor core of a second processor core power domain of the plurality of processor core power domains while the first processor core remains in the power-collapsed state, responsive to the first processor core entering the power-collapsed state, and further responsive to determining that a configuration bit indicating whether to enable allocation and snooping of the private cache is set.

* * * * *